(12) United States Patent
Saito

(10) Patent No.: US 10,717,009 B2
(45) Date of Patent: Jul. 21, 2020

(54) PROGRAM, SERVER DEVICE, AND CONTROL METHOD

(71) Applicant: GREE, INC., Tokyo (JP)

(72) Inventor: Jun Saito, Tokyo (JP)

(73) Assignee: GREE, INC., Tokyo (JP)

(*) Notice: Subject to any disclaimer, the term of this patent is extended or adjusted under 35 U.S.C. 154(b) by 41 days.

(21) Appl. No.: 16/045,000

(22) Filed: Jul. 25, 2018

(65) Prior Publication Data

US 2019/0030438 A1    Jan. 31, 2019

(30) Foreign Application Priority Data

Jul. 31, 2017   (JP) .................................. 2017-148513

(51) Int. Cl.
```
A63F 9/00       (2006.01)
A63F 13/79      (2014.01)
A63F 13/847     (2014.01)
A63F 13/25      (2014.01)
A63F 13/35      (2014.01)
```

(52) U.S. Cl.
CPC .............. *A63F 13/79* (2014.09); *A63F 13/25* (2014.09); *A63F 13/35* (2014.09); *A63F 13/847* (2014.09)

(58) Field of Classification Search
None
See application file for complete search history.

(56) References Cited

U.S. PATENT DOCUMENTS

| | | | | |
|---|---|---|---|---|
| 2006/0183541 A1* | 8/2006 | Okada | ..................... | G07F 17/32 463/29 |
| 2013/0165237 A1 | 6/2013 | Park | | |
| 2013/0260866 A1* | 10/2013 | Inubushi | ................. | G06F 13/00 463/24 |
| 2013/0337906 A1* | 12/2013 | Ikeda | ..................... | A63F 13/69 463/29 |
| 2014/0309039 A1* | 10/2014 | Yoshida | ................. | A63F 13/35 463/42 |
| 2017/0069168 A1* | 3/2017 | Rush | ................... | G07F 17/3248 |
| 2017/0197143 A1 | 7/2017 | Park | | |
| 2018/0001190 A1* | 1/2018 | Kerr | ........................ | A63F 13/26 |
| 2018/0193741 A1* | 7/2018 | Kiwada | .................. | A63F 13/35 |
| 2018/0280806 A1* | 10/2018 | Otomo | .................. | A63F 13/795 |

FOREIGN PATENT DOCUMENTS

| | | |
|---|---|---|
| JP | 2013-128776 A | 7/2013 |
| JP | 5841280 B1 | 1/2016 |
| JP | 6075494 B1 | 2/2017 |

OTHER PUBLICATIONS

Feb. 5, 2019 Office Action issued in Japanese Patent Application No. 2017-148513.

* cited by examiner

*Primary Examiner* — Seng H Lim

(74) *Attorney, Agent, or Firm* — Oliff PLC

(57) ABSTRACT

A server device that provides a plurality of client devices with a game obtains a first request from a first client device of a first user. Responsive to obtaining the first request, the server device outputs first identification information corresponding to the first user. The server device obtains a second request including the first identification information from a second client device of a second user. Responsive to obtaining the second request, the server device corrects second user information on the second user using correction data based on first user information on the first user. The server device causes the second client device to display at least part of the corrected second user information.

14 Claims, 7 Drawing Sheets

Fig.2

| User ID | User Parameter | | | | Game Content Information | History Data | | |
|---|---|---|---|---|---|---|---|---|
| | Rank | Upper Limit Number of Possessions | Deck Capacity | ... | | Login History | Event History | ... |
| *** | *** | *** | *** | ... | *** | *** | *** | ... |

Fig.3

| Game Content ID | Level | Rarity | Cost | Healthiness | Attack Power |
|---|---|---|---|---|---|
| *** | *** | *** | *** | *** | *** |
| *** | *** | *** | *** | *** | *** |
| ⋮ | ⋮ | ⋮ | ⋮ | ⋮ | ⋮ |

PROGRAM, SERVER DEVICE, AND CONTROL METHOD

BACKGROUND

The present disclosure relates to a program, an information processing device, and a control method.

Some of the conventional game systems include an information processing device that executes a game. For example, Japanese Patent No. 5841280 discloses a game system that includes a server device and multiple terminal devices and executes a game in which users play against each other.

Conventionally, a game may be operated over a relatively long period. In such a case, the difference in the experience of playing the game tends to be relatively large between users. In a case in which multiple users play against or cooperate with each other in the game, each user is not necessarily able to play the game under a fair condition when the difference in the experience of playing the game is relatively large between the users. Even if the experience of playing the game is almost the same between the users, the values of game parameters may be deviated between the users and the game contents such as characters possessed by each user in the game may be different. In such a case, when multiple users play against or cooperate with each other in the game, each user is not necessarily able to play the game under a fair condition. When each user is unable to play the game under a fair condition, the motivation for the user to play the game may decrease. Thus, it is desired that the user be motivated to play the game.

SUMMARY

It is an object of the present disclosure to provide a program, an information processing device, and a control method that motivate the user to play the game.

One aspect of the present disclosure provides a non-transitory computer-readable medium that stores a computer-executable instruction. The instruction, when executed by circuitry of a server device that provides a plurality of client devices with a game, causes the circuitry to obtain a first request from a first client device of a first user, responsive to obtaining the first request, output first identification information corresponding to the first user, obtain a second request including the first identification information from a second client device of a second user, responsive to obtaining the second request, correct second user information on the second user using correction data based on first user information on the first user, and cause the second client device to display at least part of the corrected second user information.

Another aspect provides a server device that provides a plurality of client devices with a game. The server device includes circuitry. The circuitry is configured to obtain a first request from a first client device of a first user, responsive to obtaining the first request, output first identification information corresponding to the first user, obtain a second request including the first identification information from a second client device of a second user, responsive to obtaining the second request, correct second user information on the second user using correction data based on first user information on the first user, and cause the second client device to display at least part of the corrected second user information.

A further aspect provides a method. The method includes obtaining, by circuitry of a server device that provides a plurality of client devices with a game, a first request from a first client device of a first user, responsive to obtaining the first request, outputting, by the circuitry, first identification information corresponding to the first user, obtaining, by the circuitry, a second request including the first identification information from a second client device of a second user, responsive to obtaining the second request, correcting, by the circuitry, second user information on the second user using correction data based on first user information on the first user, and causing, by the circuitry, the second client device to display at least part of the corrected second user information.

Other aspects and advantages of the present disclosure will become apparent from the following description, taken in conjunction with the accompanying drawings, illustrating by way of example the principles of the present disclosure.

BRIEF DESCRIPTION OF THE DRAWINGS

The present disclosure, together with objects and advantages thereof, may best be understood by reference to the following description of the presently preferred embodiments together with the accompanying drawings in which:

FIG. 2 is a diagram illustrating information on a user;

FIG. 3 is a diagram illustrating information on a game content;

DETAILED DESCRIPTION OF THE PREFERRED EMBODIMENTS

One embodiment of the present invention will now be described.

Game System

Figure 1:
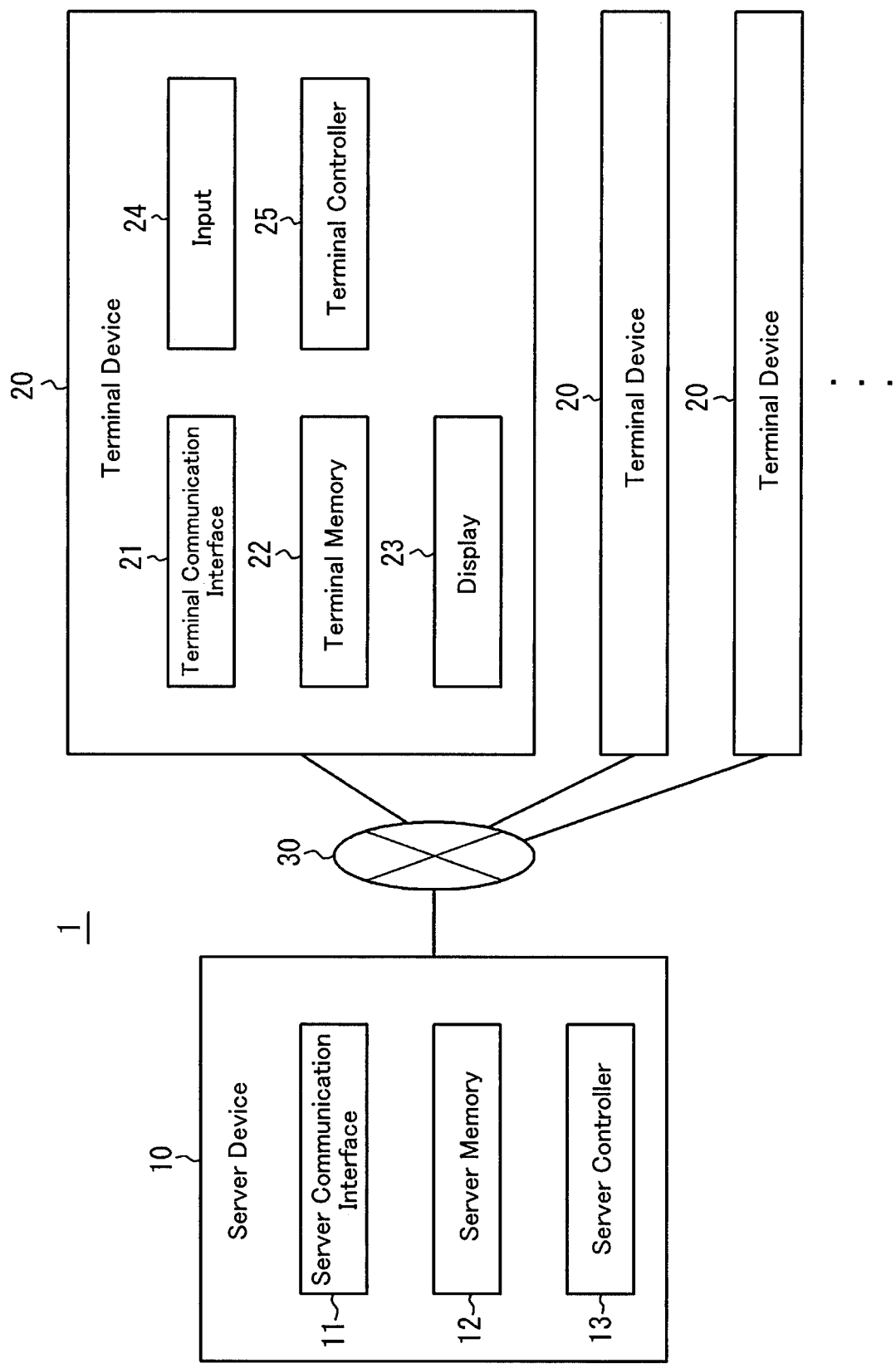
FIG. 1 is a block diagram illustrating a game system according to one embodiment of the present invention.

The overview of a game system 1 according to one embodiment of the present invention will now be described with reference to FIG. 1. The game system 1 includes a server device 10 and one or more terminal devices 20 (client devices). Although FIG. 1 shows three terminal devices 20 to facilitate understanding, any number of terminal devices 20 may be provided.

The server device 10 is, for example, an information processing device such as a server managed by a game operator. Each terminal device 20 is, for example, an information processing device used by the user such as a mobile phone, a smartphone, a tablet terminal, a personal computer (PC), or a game device. The terminal device 20 is capable of executing an application of the game according to the present embodiment. The application of the game may be obtained, for example, by the terminal device 20 from a predetermined application delivery server via a network 30 such as the internet. Alternatively, the application of the game may be stored in advance, for example, in a storage device of the terminal device 20 or in a memory medium such as a memory card readable by the terminal device 20. The server device 10 and the terminal devices 20 are connected to each other via the network 30 in a communicable manner.

The server device 10 and the terminal device 20 cooperate to execute multiple processes on the game. For example, the server device 10 and the terminal device 20 may execute a series of processes in a split manner. Alternatively, for example, the server device 10 and the terminal device 20 may execute the same process. When the process result of the server device 10 is identical with the process result of the terminal device 20, the server device 10 and the terminal device 20 may complete the same process. When the process results are not identical, the server device 10 and the terminal device 20 may complete the process by, for example, determining the process result of the server device 10 to be correct or may return the process to that prior to the execution of the same process. In such a configuration, for example, even if the quality of communication between the server device 10 and the terminal device 20 temporarily decreases, the process is less likely to be interrupted immediately. Additionally, in the terminal device 20, for example, even if an unauthorized process such as rewriting the value of a parameter is performed, the unauthorized process is more likely to be eliminated.

Overview of Game

The overview of the game according to the present embodiment will now be described. The game according to the present embodiment includes one or more game parts. At least one of the game parts may be executed using a game content (described below). During the execution of the game parts, the game content may be operated by, for example, the user or artificial intelligence (AI). The AI may be implemented by, for example, a processor of the server device 10 or the terminal device 20.

The game content is electronic data on the game such as an object in the game. The game content includes any content such as cards, items, virtual currency, tickets, characters, avatars, levels, statuses, values of parameters (health value, attack power, or the like), or capability information (skill, ability, spell, job, or the like). The game content may be obtained, possessed, used, managed, exchanged, combined, reinforced, sold, abandoned, or donated by the user in the game. The game content does not have to be utilized in the manner explicitly indicated in the present specification.

Hereinafter, except when explicitly indicated, "a game content possessed by a user" means a game content associated with a user ID from which the user is uniquely identifiable. Further, "assigning a game content to a user" means associating a game content with a user ID corresponding to the user. Further, "discarding a game content possessed by a user" means cancelling the association of the user ID with the game content. Further, "consuming a game content possessed by a user" means causing some effects or influence to be produced in response to the cancellation of the association of the user ID with the game content. Further, "selling a game content possessed by a user" means cancelling the association of the user ID with the game content and associating other game contents (for example, virtual currency or items) with the user ID. Further, "transferring a game content possessed by user A to user B" means cancelling the association of the user ID of user A with the game content and associating the game content with the user ID of user B. Further, "creating a game content" means defining or determining at least part of the information on the game content.

A game part may include any content playable by the user in the game. For example, a game part may include a content such as a quest, a mission, a mini-game, acquisition, development, reinforcement, and synthesis of a game content, exploration of a virtual space, and play against an opponent (for example, other users, enemy character, and building of enemy). One or more predetermined game tasks may be set to each game part. When it is determined that one or more game tasks set to the game part played by the user have been successfully accomplished, the user may be assigned with the game content or the like as a reward. A game task may include any task corresponding to the content of the game part, for example, a task of winning the play against an enemy character, a task of reaching a goal point in a virtual space, and a task in which the character of the user does not transition to a predetermined state (for example, state in which healthiness (described below) is zero) until a predetermined time has elapsed. Additionally, accomplishing a particular game task (task to be cleared) of one or more game tasks set to the game part is referred to as clearing the game part. When the user playing the game part has successfully accomplished the task to be cleared, the game part is determined to be cleared. In this case, the game part may end.

One or more game parts may include a single-play game part and a multi-play game part. The single-play game part may include, for example, a game part executed based on a user operation performed on one terminal device 20 used by one user (for example, game part for one person). For example, the single-play game part is executed independently by one terminal device 20 or executed cooperatively by one terminal device 20 and the server device 10. The multi-play game part may include a game part common to two or more users that is executed based on user operations performed on two or more terminal devices 20 used respectively by two or more users (for example, game part for multiple persons). The game part common to two or more users may include, for example, a game part in which at least part of the progress process of the game part and at least part of the process result are commonly applied to the two or more users. For example, the multi-play game part is executed cooperatively by two or more terminal devices 20 or executed cooperatively by two or more terminal devices 20 and the server device 10. The multi-play game part may include a game part in which multiple users play against or cooperate with each other in the game. One game part may correspond to both the single play and the multi-play.

Server Device

The server device 10 will now be described in detail. The server device 10 includes a server communication interface 11, a server memory 12, and a server controller 13.

The server communication interface 11 communicates with an external device in a wireless or wired manner and includes one or more interfaces that transmit and receive information. The server communication interface 11 may include, for example, a wireless local area network (LAN) communication module or a wired LAN communication module. The server communication interface 11 is capable of transmitting and receiving information with the terminal devices 20 via the network 30.

The server memory 12 includes one or more memories. The memory may include, for example, a semiconductor memory, a magnetic memory, or an optical memory. The server memory 12 may function as, for example, a primary storage device or a secondary storage device. The server memory 12 stores information and programs used to process the game. At least part of the information and programs stored in the server memory 12 may be shared and synchronized between the terminal devices 20. Examples of the information stored by the server memory 12 will hereinafter be described in detail.

Information on User

The server memory 12 stores information on multiple users. FIG. 2 shows information on one user. Information on a user (user information) may include any information and data unique to the user. For example, user information includes a user ID, a value of a user parameter, information on a game content (game content information), and history data. In user information, a value of a user parameter, game content information, and history data are each associated with the user ID.

The user ID is information from which the user is uniquely identifiable. Hereinafter, a user ID may simply be referred to as a user.

A user parameter may include any parameter used when the user plays the game. For example, a user parameter includes a rank, the upper limit number of possessions, and a deck capacity.

The rank is a parameter indicating the dexterity or play experience of the user on the game. In the present embodiment, the value of a rank may increase in accordance with the game play by the user. As the rank is higher, the dexterity or play experience of the user on the game is higher or the play experience is longer.

The upper limit number of possessions indicates the upper limit number of game contents (for example, characters or items) that can be possessed by the user in the game. That is, the upper limit number of possessions indicates the upper limit number of game contents that can be associated with the user. For example, the upper limit number of possessions may increase as the rank increases.

The deck capacity is a parameter used to limit game contents that can be encompassed in one deck. One deck may encompass one or more game contents used for a game part. A parameter of "cost" (described below) is set to a game content. Within a range in which the total value of the costs of game contents encompassed in the deck is less than or equal to the deck capacity, the deck can encompass one or more of any contents possessed by the user in the game. The upper limited number n of game contents that can be encompassed in one deck may be set. In such a case, within a range in which the total value of the costs of game contents encompassed in the deck is less than or equal to the deck capacity, the deck can encompass the n game contents at the maximum of those possessed by the user in the game. For example, the deck capacity may increase as the rank increases.

The user parameter is not limited to the above example. For example, a user parameter may include, among multiple game parts included in the game, information indicating one or more game parts the user is permitted to play. The game part that requires the permission for the user to play the game may include, for example, a multi-play game part, a game part in which game contents are combined, and a game part of chatting with other users. For example, when the rank of the user reaches a predetermined value, the number of game parts the user is permitted to play may increase.

Information on Game Content

Information on a game content (game content information) may include any information and data unique to the game content possessed by the user in the game. For example, the game content information shown in FIG. 3 indicates information on two game contents possessed by the user in the game. For example, the game content information includes a game content ID, level, rarity, cost, healthiness, and attack power. In the game content information, level, rarity, cost, healthiness, and attack power are associated with a game content ID.

The game content ID is information from which the game content is uniquely identifiable. Hereinafter, a game content ID is simply referred to as a game content.

The level is information indicating the degree of growth of a game content. For example, as the value of the level is larger, the degree of growth of the game content is larger. In the present embodiment, the level may increase in accordance with the game play by the user.

The rarity is information indicating the degree of rareness of the game content. For example, as the value of the level is larger, the degree of rareness of the game content is larger. Rarity may increase in accordance with the game play by the user. For example, the upper limit value of the level may increase as the rarity increases.

The cost is a parameter used together with a deck capacity to limit the game contents that can be encompassed in one deck. For example, the cost may increase as the level or rarity increases.

The healthiness is a parameter indicating the degree of deterioration of a game content. The healthiness of a game content may decrease, for example, in a game part where the game content plays against other game contents, which are opponents, when the game content is attacked by the opponents. When the healthiness decreases to a predetermined value (for example, zero), a process for making the game content disadvantageous in the game is executed. The process may include, for example, a process for temporarily prohibiting the execution of an action by the game content, a process for temporarily deleting the game content from a virtual space, and a process for changing the data of the game content. Thus, as the healthiness of the game content is larger, the user is more advantageous. For example, the healthiness may increase as the level or rarity increases.

The attack power is a parameter used to determine the amount of damage given by a game content to an opponent. As the value of the attack power becomes larger, the amount of damage to the opponent increases. The healthiness of the opponent decreases by an amount corresponding to the damage amount. Thus, as the attack power of the game content is larger, the user is more advantageous. For example, the attack power may increase as the level or rarity increases.

The game content information is not limited to the examples described above. For example, the game content information may include an attribute that is set to the game content. An attribute is information indicating an attribute of the game content. An attribute may include multiple first attributes (for example, fire attribute, wood attribute, and water attribute) indicating the superiority-inferiority relationship between game contents that play against each other. At least one of the first attributes is associated with one game content. For example, a fire-attribute game content gives a relatively large damage to a wood-attribute content and gives a relatively small damage to a water-attribute content. In this manner, for example, the fire attribute is advantageous over the wood attribute and disadvantageous over the water attribute. The attribute may include multiple second attributes (for example, attack attribute, recovery attribute, and balance attribute) that do not affect the superiority-inferiority relationship between game contents that play against each other. At least one of the second attributes is associated with one game content. For example, one game content in which the first attribute is the fire attribute and the second attribute is the attack attribute may exist.

History Data

The history data shown in FIG. 2 may include any data on the history of the game played by the user. For example, the history data includes a login history and an event history.

The login history may include any data on a history where an application of the game was launched. For example, the login history may include the first day when the application of the game was launched using the terminal device 20 (initial launch day), the number of days elapsed from the initial launch day to the current time, a past period in which the user launched the application of the game using the terminal device 20, the total number of days of the past period, the frequency at which the game of the application was launched, and the like.

The event history may include any data on one or more events held in the game during a past predetermined period. Holding an event may include, for example, permitting at least part of multiple users who satisfies a predetermined condition to play the event. For example, the event history may include whether or not the user has accomplished a predetermined game task that is set in the event, a point, a score, and a title gained by the user in the event, and the like.

The server controller 13 shown in FIG. 1 includes one or more processors. The processor may include a general-purpose processor and a dedicated processor specializing in particular processes. The server controller 13 controls the operation of the entire server device 10. An example of the operation of the server controller 13 will hereinafter be described in detail.

The server controller 13 stores, in the server memory 12, various information and programs used to process the game. The information used to process the game may include user information, game content information, and the like, which have been described above.

The server controller 13 transmits and receives information via the server communication interface 11. For example, the server controller 13 may transmit, to the terminal device 20, at least part of the information stored in the server memory 12. In this manner, the server device 10 and the terminal device 20 share the information stored in the server memory 12 and the information stored in the terminal device 20 so that they are synchronized with each other. The time of sharing and synchronizing information may include, for example, a time at which new information was stored in the server memory 12 and a time at which the information stored in the server memory 12 was updated. However, the time of sharing and synchronizing information may be set to any time. Further, for example, the server controller 13 may obtain, via the server communication interface 11, any information input or determined in the terminal device 20. The information may include, for example, information that has been input by the user.

The server controller 13 cooperates with the terminal device 20 to execute the game. For example, the server controller 13 cooperates with one or more terminal devices 20 to execute a game part. Further, for example, the server controller 13 cooperates with two or more terminal devices 20 to execute a series of processes for correcting information on the second information (second user information) based on information on the first information (first user information). The operation of the server device 10 of the terminal device 20 that executes the series of processes will be described in detail below.

Terminal Device

The terminal device 20 will now be described in detail. As shown in FIG. 1, the terminal device 20 includes a terminal communication interface 21, a terminal memory 22, a display 23, an input unit 24, and a terminal controller 25.

The terminal communication interface 21 communicates with an external device in a wireless or wired manner and includes an interface that transmits and receives information. The terminal communication interface 21 may include a wireless communication module corresponding to a mobile communication standard such as Long Term Evolution (LTE, registered trademark), a wireless LAN communication module, a wired LAN communication module, and the like. The terminal communication interface 21 is capable of transmitting and receiving information with the server device 10 via the network 30.

The terminal memory 22 includes, for example, a semiconductor memory, a magnetic memory, or an optical memory. The terminal memory 22 may function as, for example, a primary storage device or a secondary storage device. The terminal memory 22 may be incorporated in the terminal device 20 or connected to the terminal device 20 via an interface. The terminal memory 22 stores information and programs used to process the game. For example, the terminal memory 22 may store an application program of the game obtained from a predetermined application delivery server. An application program may hereinafter be simply referred to as an application. The terminal memory 22 may store part of or all of user information, information on a first game content, information on a second game content, and information on a third game content that are obtained from the server device 10.

The display 23 includes, for example, a display device such as a liquid crystal display or an organic EL display. The display 23 is capable of displaying a variety of views.

The input unit 24 includes an input interface that receives a user operation. The input interface may include, for example, a pointing device such as a mouse, a physical key, and a touch panel provided integrally with the display 23.

The terminal controller 25 includes one or more processors. The terminal controller 25 controls the operation of the entire terminal device 20. An example of the operation of the terminal controller 25 will now be described in detail.

The terminal controller 25 transmits and receives information via the terminal communication interface 21. For example, the terminal controller 25 obtains information and programs used to process the game. More specifically, the terminal controller 25 may obtain an application of the game from a predetermined application delivery server. The terminal controller 25 may obtain part of or all of the information on a user and the game content information from the server device 10.

The terminal controller 25 launches the application of the game in response to a user operation. The terminal controller 25 cooperates with the server device 10 to execute the game. For example, the terminal controller 25 causes the display 23 to display a view used for the game. The screen may display, for example, multiple graphical user interfaces (GUIs) that detect user operations. The terminal controller 25 is capable of detecting a user operation on the screen via the input unit 24. Further, for example, the terminal controller 25 cooperates with the server device 10 and one or more other terminal devices 20 to execute a series of processes for correcting the second user information based on the first user information.

Operations of Server Device and Terminal Device

The operations of the server device 10 and the terminal device 20 that cooperate to execute the series of processes for correcting the second user information based on the first user information will now be described in detail.

A terminal controller 25a of a first terminal device 20a of the first user transmits a first request to the server device 10, for example, in response to a user operation or automatically. The first user has already installed an application of the game in his or her terminal device 20. The terminal controller 25a may transmit the first request only a predetermined number of times (for example, once) when, for example, the rank of the first user reaches a predetermined threshold value (for example, 100 points). For example, the first request may include a request for inviting, to the game, a user who has not installed the application of the game, a request for urging an inactive user who has not logged in to the game to log in to the game, a request for transmitting a message from the first user to another user, and the like.

The server controller 13 obtains the first request from the first terminal device 20a. The server controller 13 creates identification information corresponding to the first user. From the identification information, the first user is uniquely identifiable. The identification information may include, for example, a user ID of the first user. The server controller 13 outputs identification information to notify one or more second users of the identification information.

More specifically, when a user who has not installed an application of the game in his or her terminal device 20 is defined as the second user, the server controller 13 may, for example, directly transmit identification information to a second terminal device 20b of the second user via email or list the identification information on a homepage that may be viewed by the second user. Alternatively, the server controller 13 may output identification information to the first terminal device 20a of the first user and further output the identification information to the first terminal device 20a. The terminal controller 25b may obtain the application from a predetermined application delivery server to install and launch the application. When the application of the game is launched, the server device 10 and the second terminal device 20b cooperate to execute a predetermined user registration process. When the user registration process is executed, the second user information is stored in the server memory 12.

When a user who has installed the application of the game in his or her terminal device 20 is defined as the second user, the server controller 13 may cause the second terminal device 20b of the second user to display identification information while the second terminal device 20b is executing the game.

The terminal controller 25b of the second terminal device 20b of the second user notified of the above identification information transmits a second request including the identification information to the server device 10. For example, the second request may include a request for correcting the second user information.

The server controller 13 obtains the second request from the second terminal device 20b. The server controller 13 may obtain the second request each from multiple second terminal devices 20b that are respectively used by multiple second users. The server controller 13 creates correction data based on the first user information. The server controller 13 uses correction data to correct the second user information.

For example, the server controller 13 may correct at least part of user parameters (for example, rank) included in the second user information based on correction data. In such a case, correction data may be created based on the rank of the first user. For example, when the value of the rank of the first user is set to x points, the correction data may include data in which the value of the rank of the second user is corrected to $\alpha x$. The coefficient $\alpha$ is, for example, 0.5 but may be set to any value. Alternatively, when the value of the rank of the second user prior to correction is set to y points, the correction data may include data in which the value of the rank of the second user is corrected to $\beta x+(1-\beta)y$. Coefficient $\beta$ may be $0<\beta$, $<1$. The same applies to a case of correcting the upper limit number of possessions and deck capacity among the user parameters.

In such a configuration, for example, when the second user has just started the game, the value of the user parameter of the second user is corrected based on the value of the game parameter of the first user, who has a relatively long play experience of the game. This allows the value of the user parameter of the second user to reach, without spending a long time, a value of the user parameter that can conventionally be attained only through accumulation of the experience of playing the game by spending a long time. This can motivate the second user to play the game. In addition, for example, when the first user and the second user play against or cooperate with each other in the game, the difference in user parameters decreases between the first user and the second user. This allows each user to play the game under a condition that is almost fair. Thus, the first user can also be motivated to play the game.

In addition, for example, the server controller 13 may correct at least part of the game content information included in the second user information (for example, game content possessed by the second user in the game) based on correction data. In such a case, the correction data may be created based on the information on the game content associated with the first user (i.e., the information on the game content possessed by the first user in the game). For example, when a game content A is associated with the first user, the correction data may include data in which another game content B based on the game content A is associated with the second user. In such a case, correction is performed to assign the game content B to the second user. The data of the game content B excluding the game content ID (level, rarity, cost, healthiness, and attack power) may be the same as or different from the data of the game content A. For example, regardless of the value of the level of the game content A, the level of the game content B may be an initial value (for example, 1 point). Further, for example, regardless of the rarity of the game content A, the rarity of the game content B may be a predetermined value (for example, normal).

In such a configuration, for example, even when the second user has just started the game, i.e., even when the second user has only a slight play experience of the game, the second user is assigned with the other game content B, which is based on the game content A possessed in the game by the first user having a relatively long play experience of the game. Thus, without spending a relatively long time, the second user can gain the game content B that can conventionally be gained only through accumulation of the experience of playing the game by spending a long time. This can motivate the second user to play the game. In addition, for example, when the first user and the second user play against or cooperate with each other in the game, the difference in game contents possessed by the first user and the second user decreases. This allows each user to play the game under a condition that is almost fair. Thus, the first user can also be motivated to play the game.

Additionally, for example, the server controller 13 may correct at least part of history data included in the second user information based on correction data.

More specifically, when the login history of the second user is corrected, the correction data may be created based on the login history of the first user. In such a case, the correction data may include data during a non-play period in which the game was not played by the second user. The non-play period includes, for example, a period before the second user installs the application of the game in the second terminal device 20b and a period in which the application is not launched after the installation. When the correction data is used to correct the login history of the second user, for example, the initial launch day, in which the second user first launched the application of the game using the second terminal device 20b, may be corrected to a further past day. For example, the initial launch day of the second user may be corrected to the same day as the initial launch day of the first user. Alternatively, the initial launch day of the second user may be corrected to any day from the initial launch day of the first user to the initial launch day of the second user.

In such a configuration, for example, when the second user has just started the game, the initial launch day of the second user is corrected to a further past day based on the login history of the first user having a relatively long play experience of the game. Thus, the second user can gain, without spending a relatively long time, a login history that can conventionally be gained only through accumulation of experience of playing the game by spending a long time. This can motivate the second user to play the game. In addition, for example, when the second user cooperates with another user in the game, the other user can be encouraged to think that the second user is a skilled user having a relatively long play experience of the game. Thus, the other user is more likely to send a call for the second user to cooperate in the game. This can motivate the second user to play the game.

In addition, more specifically, when the event history of the second user is corrected, correction data may be created based on the event history of the first user. In such a case, the correction data may include data on an event that was not played by the second user. The event that was not played by the second user may include an event held during the non-play period of the second user and an event that was not played by the second user though held during a play period in which the game was played by the second user. When the correction data is used to correct the event history of the second user, for example, whether or not the user has accomplished a predetermined game task that is set to the event, data such as a point, score, and title gained by the user in the event, and the like are added to the event history of the second user.

In such a configuration, even in a past event that was not actually played by the second user, the event history of the second user is corrected as if the event was played by the second user. Thus, the second user can obtain, without spending a relatively long time, an event history that can conventionally be gained only through accumulation of experience of playing the game by spending a long time. This can motivate the second user to play the game. In addition, for example, when the second user cooperates with another user in the game, the other user can be encouraged to think that the second user is a skilled user having a relatively long play experience of the game. Thus, the other user is more likely to send a call for the second user to cooperate in the game. This can motivate the second user to play the game.

Upon correcting the second user information, the server controller 13 may permit the second user to play a predetermined game part based on the corrected second user information. For example, when correction is performed so that the rank included in the second user information becomes greater than or equal to a predetermined value, the second user may be able to play the predetermined game part (for example, multi-play game part). In such a configuration, part of the game part that is conventionally permitted to be played only through accumulation of experience of playing the game by spending a long time can be played without spending a relatively long time. This can motivate the second user to play the game.

The server controller 13 may cause at least one of the first terminal device 20a of the first user and the second terminal device 20b of the second user to display at least part of the corrected second user information.

The server controller 13 may correct information on multiple second users until the number of second users whose information is corrected reaches a predetermined upper limit number. The server controller 13 may associate a predetermined reward (for example, game content) with the first user, for example, every time information on the second user is corrected.

First Operation of Server Device

Figure 4:
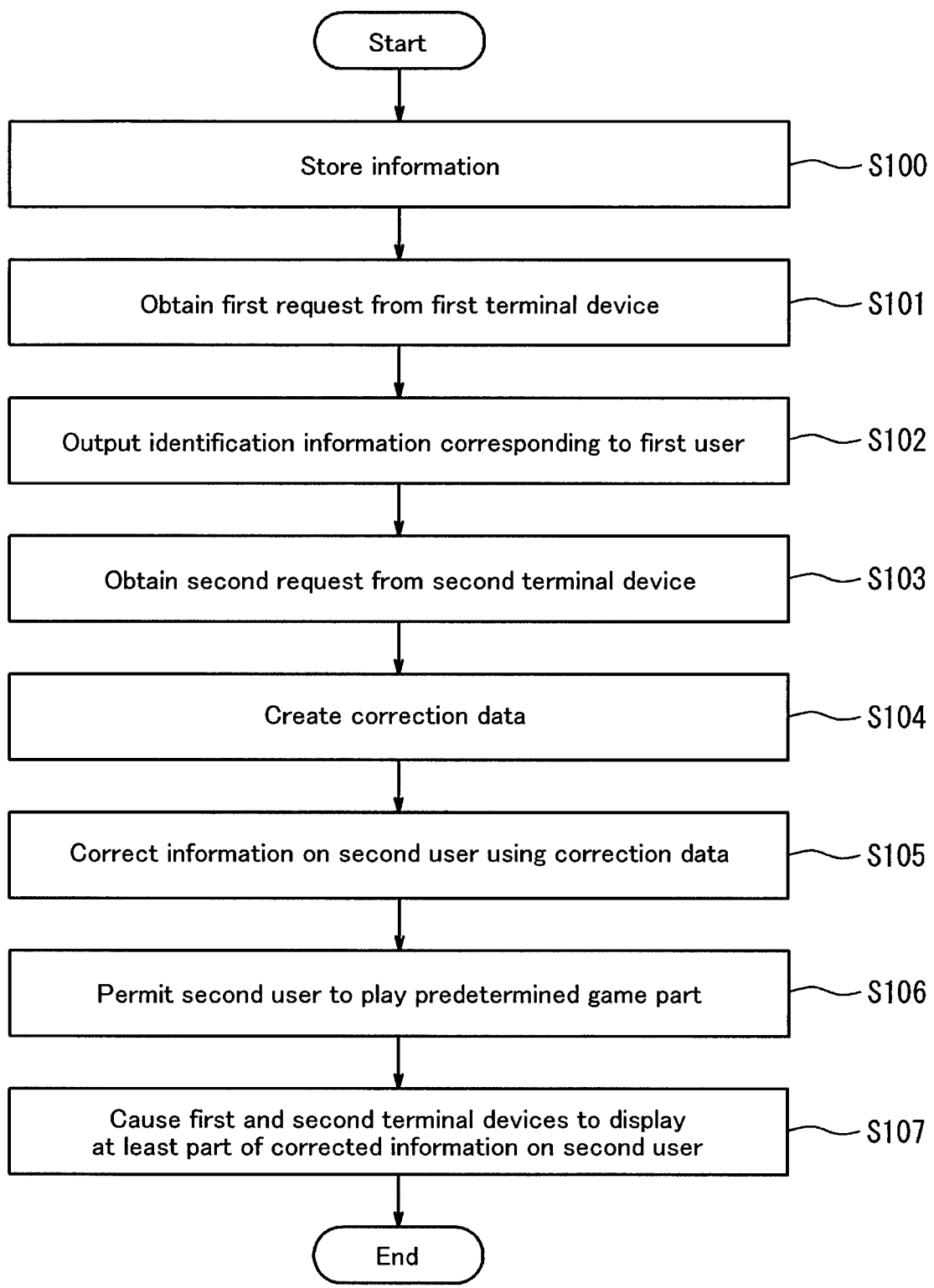
FIG. 4 is a flowchart illustrating a first operation of a server device.

An example of the first operation of the server device 10 that executes the above process will now be described with reference to FIG. 4.

Step S100: The server controller 13 stores, in the server memory 12, various information and programs used to process the game. For example, the server controller 13 stores information on multiple users and information on a game content in the server memory 12.

Step S101: The server controller 13 obtains the first request from the first terminal device 20a of the first user.

Step S102: The server controller 13 creates identification information corresponding to the first user and outputs the identification information so that one or more second users may be notified of the identification information.

Step S103: The server controller 13 obtains the second request from the second terminal device 20b of the second user.

Step S104: The server controller 13 creates correction data based on the first user information.

Step S105: The server controller 13 uses the correction data to correct the second user information.

Step S106: The server controller 13 permits the second user to play a predetermined game part based on the corrected second user information.

Step S107: The server controller 13 causes at least one of the first terminal device 20a of the first user and the second terminal device 20b of the second user to display at least part of the corrected second user information.

As described above, upon obtaining the first request from the first terminal device 20a of the first user, the server device 10 according to the present embodiment outputs identification information corresponding to the first user. Upon obtaining the second request including the identification information from the second terminal device 20b of the second user, the server device 10 uses correction data based on the first user information to correct the second user information. Conventionally, the second user needs to accumulate play experience of the game by spending a long time. However, in the embodiment of the present invention having the above configuration, the second user information is corrected without the second user spending a relatively long time. Thus, the second user can be motivated to play the game.

Although the present invention has been described with reference to the drawings and the embodiment, it should be noted that those skilled in the art can easily make various variations and modifications based on the present disclosure. It is therefore to be noted that these variations and modifications fall within the scope of the present invention. For example, the functions and the like included in each means, each step, and the like can be rearranged so as not to be logically contradictory, and it is possible to combine or divide multiple means, steps, and the like into one.

For example, in the above embodiment, the terminal device 20 may execute part of or all of operations and processes executed by the server device 10. In the same manner, the server device 10 may execute part of the operations executed by the terminal device 20. For example, the processes of display control of various views and controls of various GUIs displayed on the terminal device 20 may be executed by one of the server device 10 and the terminal device 20 or may be executed cooperatively by the server device 10 and the terminal device 20. As another option, the game system 1 does not have to include the server device 10. In such a case, the terminal device 20 may store, in advance, information received from the server device 10 in the above embodiment.

Further, in the above embodiment, the example of the operation of the terminal device 20 has been described with reference to FIG. 4. However, part of the steps included in the operation and part of operations included in a single step may be omitted. The order of some steps may be changed within a range in which they are not logically contradictory.

In addition, in the above embodiment, the server controller 13 outputs identification information of the first user. In addition to the identification information, the server controller 13 may output any information on the first user. For example, the server controller 13 may output a user parameter of the first user, game content information, history data, and the like. Further, in addition to the identification information, the server controller 13 may output, for example, the remaining number of second users whose information can be corrected. In such a configuration, the second user visually recognizing the identification information and the information on the first user can estimate the degree of play experience of the game of the first user. Thus, for example, when identification information of multiple first users is output, the second user can easily select a desired first user. This improves the usability of the game for the second user.

Additionally, in the above embodiment, upon obtaining the second request from the second terminal device 20b of the second user, the server controller 13 corrects the information on the second user. However, only if a predetermined condition is satisfied, upon obtaining the second request, the server controller 13 may correct the information on the second user.

For example, upon obtaining the second request from the second terminal device 20b of the second user, the server controller 13 may cause the first terminal device 20a of the first user to display at least part of the information on the second user in a predetermined period. The predetermined period may be set to any period. For example, the server controller 13 may cause the first terminal device 20a to display the history data of the second user in the predetermined period. The terminal controller 25a of the first terminal device 20a may transmit a correction request for correcting the information on the second user to the server device 10, for example, in response to the user operation. In this case, upon obtaining the correction request from the first terminal device 20a, the server controller 13 creates correction data and corrects the information on the second user.

Figure 5:
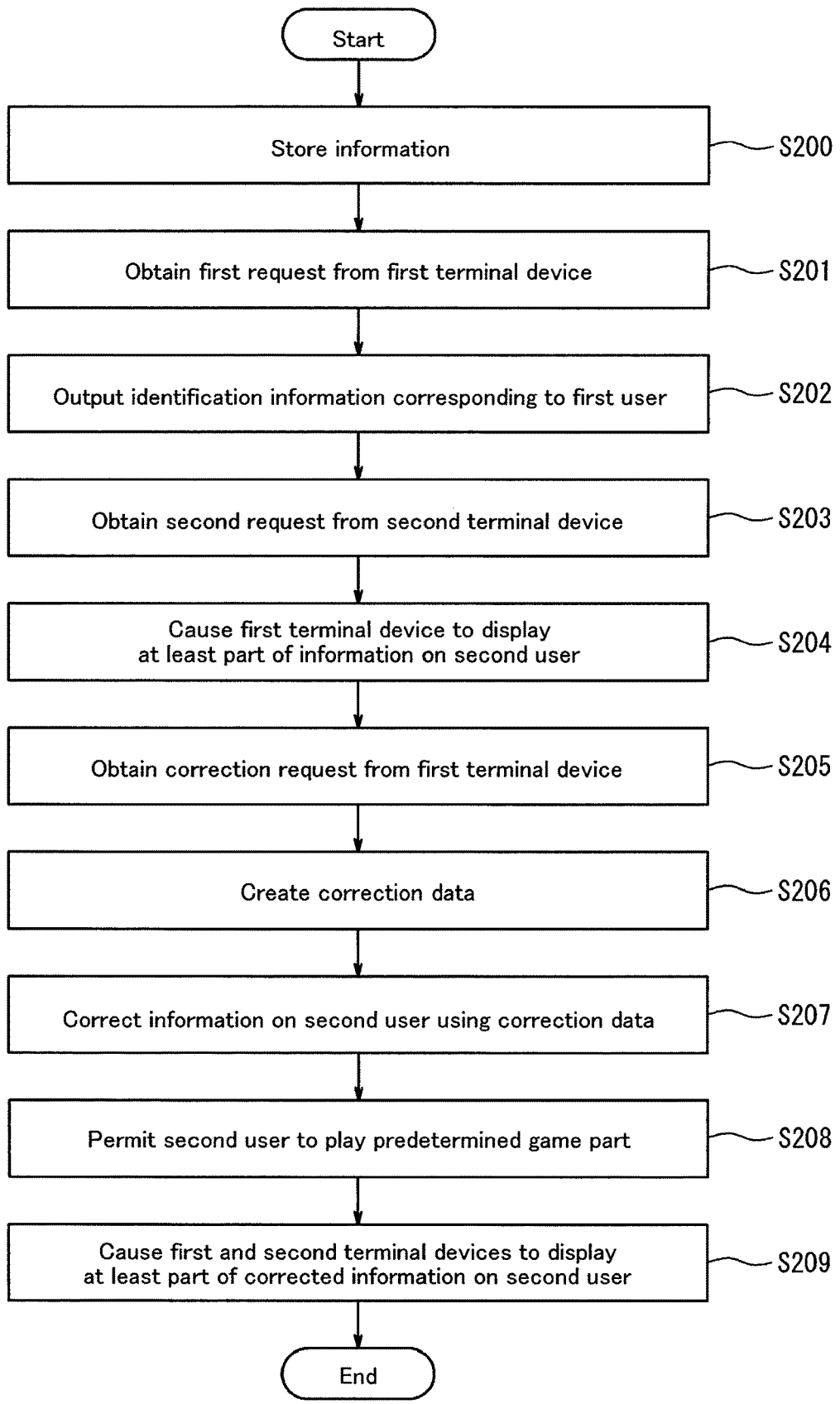
FIG. 5 is a flowchart illustrating a second operation of a server device.

An example of the second operation of the server device 10 that executes the above process will now be described with reference to FIG. 5. The second operation may be executed instead of the first operation.

Steps S200 to S203: The server controller 13 executes the same processes as those in steps S100 to S103.

Step S204: Upon obtaining the second request from the second terminal device 20b of the second user in step S203, the server controller 13 causes the first terminal device 20a to display at least part of the information on the second user in a predetermined period.

Step S205: The server controller 13 obtains a correction request from the first terminal device 20a.

Steps S206 to S209: Upon obtaining the correction request in step S205, the server controller 13 performs the same processes as those in steps S104 to S107.

In such a configuration, upon checking information on the second user displayed in the first terminal device 20a, the first user can select whether or not to correct the information on the second user. This allows the first user to select a desired second user as a correction subject as described above. Thus, the usability of the game for the user improves.

Conventionally, for example, some users who play a multi-play game part, in which multiple users play against or cooperate with each other in the game, wish to gather other users having almost the same play experience of the game as that of the user, for example, as friends in the game or peers such as guild members. However, in a game operated for a relatively long period, users who have a relatively long game experience often already belong to the same guild. Thus, it is not necessarily easy for a user to gather new peers having almost the same play experience as that of the user.

In the embodiment of the present invention, the second user information is corrected based on the first user information. Thus, for example, even when the first user and the second user differ in the play experience of the game, the difference in user information between the first user and the second user can be reduced. This can, for example, slightly reduce the disadvantage for the first user, who is thinking about gathering peers in the game, to add the second user, who has a relatively short play experience, as a peer.

For example, in a case in which the first user plays a multi-play game part together with the second user, when the first user is launching an application of the game (for example, logging in to the game), the second user may also be requested to be launching the application of the game. Thus, it is desirable that the first user be highly active in the game (for example, during a predetermined period, the frequency of launching the application is high, the increased amount of the rank of the second user is large, the number of game tasks the second user has accomplished is large, the number of times of transmitting a message to other users is large, the number of responses to calling for reinforcements from other users is large, or the number of times of playing the multi-play game part is large). In the embodiment of the present invention, upon checking the second user information displayed in the first terminal device 20a, the first user can select whether or not to correct the second user information. Thus, for example, at a stage of checking the second user information, when the second user is lowly active in the game, the first user can leave the user information of the second user uncorrected. Such a configuration is especially useful when, for example, an upper limit is set to the number of second users whose information can be corrected.

Alternatively, upon obtaining the second request from the second terminal device 20b of the second user, the server controller 13 can automatically determine whether or not a predetermined condition is satisfied based on at least part of the second user information in a predetermined period. For example, the predetermined condition may include a condition in which the second user is more active in the game than a predetermined reference (for example, the frequency of launching the application of the game by the second user is higher than a predetermined threshold value). In such a configuration, in the same manner as the above configuration of presenting the first user with at least part of the second information in a predetermined period, a second user who is believed to be desirable for the first user is automatically selected as a correction subject. This improves the usability of the game for the first user. Further, for example, the predetermined condition may include a condition in which a predetermined event (for example, a tutorial event for a beginner) has ended.

Additionally, in the above embodiment, the server controller 13 uses correction data based on the first user information to correct a user parameter included in the second user information, game content information, history data, and the like. The first user or the second user can select which information or data included in the second user information is subject to correction.

An example in which the second user selects a correction subject will now be described. Upon obtaining the second request from the second terminal device 20b of the second user, the server controller 13 causes the second terminal device 20b to display information on multiple pieces of correction data. The information on the correction data indicates an item of the second information subject to correction. For example, the server controller 13 may cause the second terminal device 20b to display six items, namely, rank, the upper limit number of possessions, deck capacity, game content information, login history, and event history, as the information on the multiple pieces of correction data. The second user selects information on one or more pieces of correction data of the information on the multiple pieces of data displayed in the second terminal device 20b. The upper limit number of pieces of information on selectable correction data may be set. The terminal controller 25b of the second terminal device 20b transmits, to the server device 10, information on at least one piece of correction data selected based on the user operation. In this case, upon obtaining the information on at least one piece of correction data selected, the server controller 13 creates the at least one piece of correction data selected. For example, when the "rank" is selected as the information on correction data, the correction data used to correct the rank of the second user is created.

Figure 6:
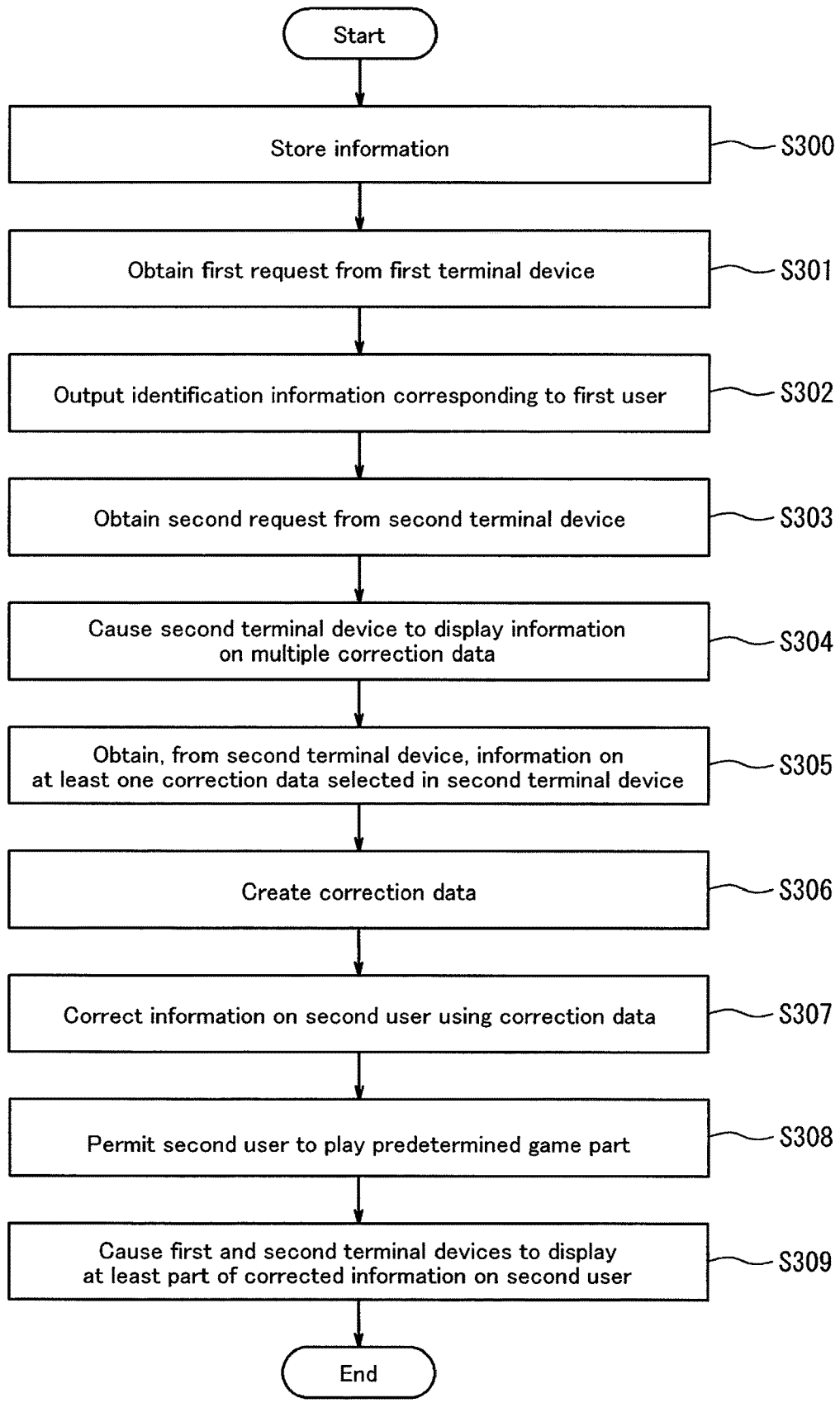
FIG. 6 is a flowchart illustrating a third operation of a server device.

An example of the third operation of the server device 10 that executes the above process will now be described with reference to FIG. 6. The third operation may be executed instead of the first operation.

Steps S300 to S303: The server controller 13 executes the same processes as those in steps S100 to S103.

Step S304: Upon obtaining the second request from the second terminal device 20b of the second user in step S303, the server controller 13 causes the second terminal device 20b to display information on multiple pieces of correction data.

Step S305: The server controller 13 obtains, from the second terminal device 20b, information on at least one piece of correction data selected in the second terminal device 20b.

Step S306: The server controller 13 creates the at least one piece of correction data selected in step S305.

Steps S307 to S309: The server controller 13 performs the same processes as those in steps S105 to S107.

In such a configuration, the second user selects which information or data included in the second user information should be deleted. This allows the second user to, for example, strategically select a subject that receives correction and have a higher sense of strategy for the game. In addition, since the second user can strategically select a subject that receives correction, the usability of the game for the second user improves.

Further, an example in which the first user selects a correction subject will now be described. Upon obtaining the first request from the first terminal device 20a of the first user, the server controller 13 causes the first terminal device 20a to display information on multiple pieces of correction data. The first user selects information on one or more pieces of correction data of the information on the multiple pieces of data displayed in the first terminal device 20a. The upper limit number of pieces of information on selectable correction data may be set. The terminal controller 25a of the first terminal device 20a transmits, to the server device 10, information on at least one piece of correction data selected based on the user operation. The server controller 13 outputs identification information corresponding to the first user and the information on at least one piece of correction data selected. For example, when the "rank" is selected as the information on correction data, in addition to the identification information of the first user, a message or the like indicating that the correction subject is the "rank" may be output.

Figure 7:
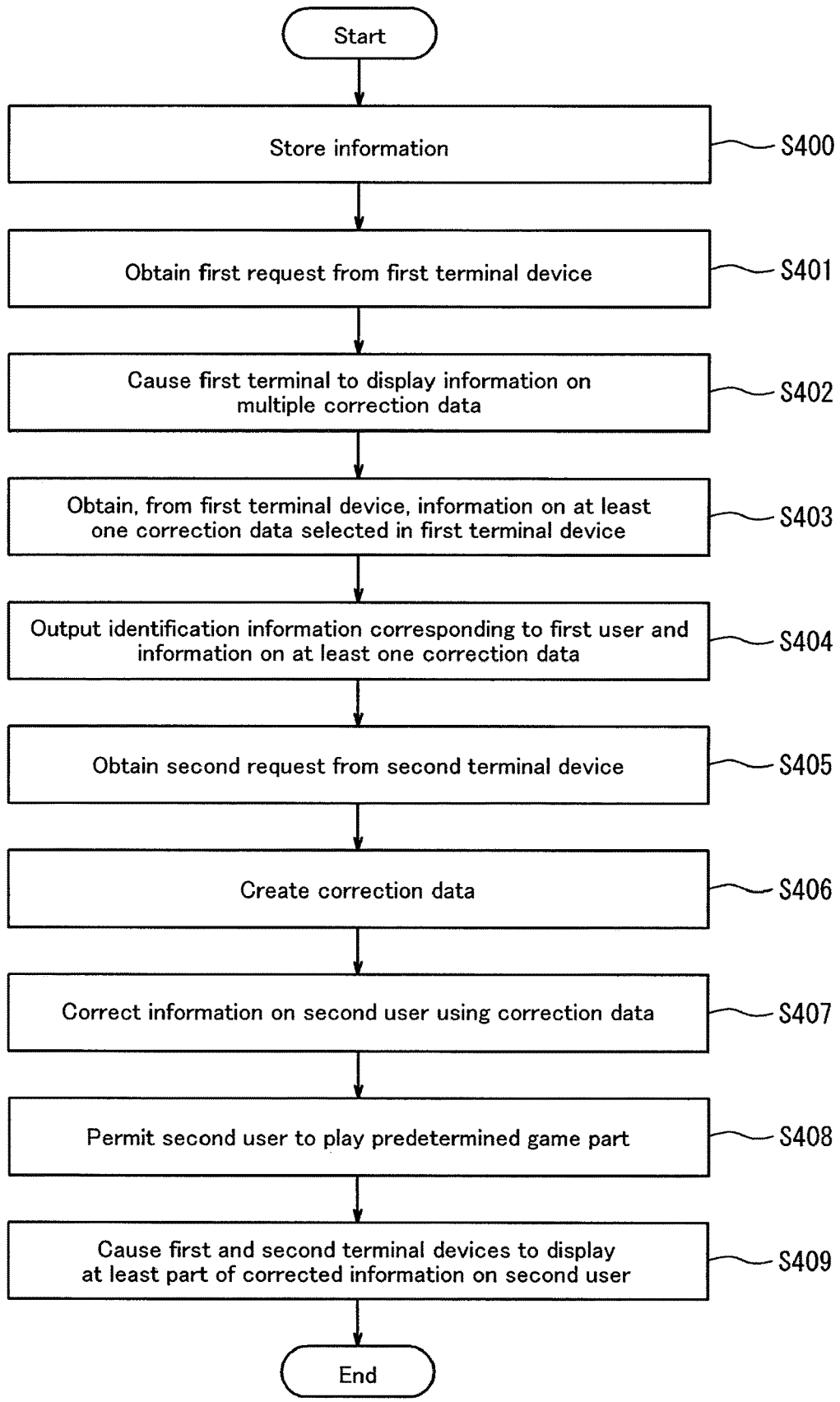
FIG. 7 is a flowchart illustrating a fourth operation of a server device.

An example of the fourth operation of the server device 10 that executes the above process will now be described with reference to FIG. 7. The fourth operation may be executed instead of the first operation.

Steps S400 and S401: The server controller 13 executes the same processes as those in steps S100 and S101.

Step S402: Upon obtaining the first request from the first terminal device 20a of the first user in step S301, the server controller 13 causes the first terminal device 20a to display information on multiple pieces of correction data.

Step S403: The server controller 13 obtains, from the first terminal device 20a, information on at least one piece of correction data selected in the first terminal device 20a.

Step S404: The server controller 13 outputs identification information corresponding to the first user and the information on the at least one piece of correction data selected in step S403.

Steps S405 to S409: The server controller 13 performs the same processes as those in step S103 to step S107.

In such a configuration, the first user selects which information or data included in the second user information should be deleted. This allows the first user to, for example, strategically select a subject that receives correction and have a higher sense of strategy for the game. In addition, since the first user can selectively select a subject that receives correction, the usability of the game for the first user improves.

In addition, in the above embodiment, at least part of the views displayed in the terminal device 20 may be web views displayed by the terminal device 20 based on the data created by the server device 10, and at least part of the views may be native views displayed by a native application installed in the terminal device 20. In this manner, the game according to the above embodiment may be a hybrid game in which each of the server device 10 and the terminal device 20 is in charge of part of the processes.

Further, an information processing device such as a computer or a mobile phone can be used so that the information processing device functions as the server device 10 or the terminal device 20 according to the above embodiment. Such an information processing device can be implemented by storing a program describing a processing content that implements each function of the server device 10 or the terminal device 20 according to the embodiment, in a memory of the information processing device, using the CPU of the information processing device to read the program, and causing the CPU to execute the program.

The server controller 13 and/or the terminal controller 25 are not limited to one that performs software processing on all processes executed by itself. For example, the server controller 13 and/or the terminal controller 25 may be equipped with a dedicated hardware circuit (e.g., application specific integrated circuit: ASIC) that performs hardware processing on at least some of the processes to be executed by itself. That is, the server controller 13 and/or the terminal controller 25 may be configured as circuitry including 1) one or more processors that operate in accordance with a computer program (software), 2) one or more dedicated hardware circuits that execute at least some of the various processes, or 3) combinations thereof. The processor includes a CPU and memories such as a RAM and a ROM, and the memory stores program codes or instructions configured to cause the CPU to execute the processing. The memories, that is, computer-readable media, include any type of media that are accessible by general-purpose computers and dedicated computers.

The invention claimed is:

1. A non-transitory computer-readable medium that stores a computer-executable instruction, wherein the instruction, when executed by circuitry of a server device that provides a plurality of client devices of a plurality of users including at least a first client device and a second client device with a game played by the plurality of users, causes the circuitry to
    obtain a first request from the first client device of a first user of the plurality of users,
    responsive to obtaining the first request, output first identification information corresponding to the first user to the second client device of a second user of the plurality of users,
    obtain a second request including the first identification information from the second client device of the second user, wherein the second request is output from the second client device responsive to the first identification information output to the second client device being selected in the second client device,
    responsive to obtaining the second request, correct second user information on the second user using correction data based on first user information on the first user such that the second user then plays the game according to the corrected second user information, and
    cause the second client device to display at least part of the corrected second user information.

2. The non-transitory computer-readable medium according to claim 1, wherein
    the second user information includes history data of the game played by the second user, and
    the instruction causes the circuitry to execute the correction if the history data of the second user within a predetermined period after the second request is obtained satisfies a predetermined condition.

3. The non-transitory computer-readable medium according to claim 1, wherein
    the second user information includes history data of the game played by the second user,
    the instruction causes the circuitry to
        responsive to obtaining the second request, cause the first client device to display at least part of the history data of the second user,
        obtain a correction request from the first client device, and
        execute the correction responsive to obtaining both the second request and the correction request.

4. The non-transitory computer-readable medium according to claim 1, wherein
    the second user information includes history data of the game played by the second user,
    the correction data includes first data during a non-play period in which the game was not played by the second user, and
    the instruction causes the circuitry to, in the correction, add the first data to the second user information as the history data of the second user.

5. The non-transitory computer-readable medium according to claim 4, wherein
    the first data during the non-play period of the second user includes data on an event in the game that was playable during at least part of the non-play period.

6. The non-transitory computer-readable medium according to claim 1, wherein
    the second user information includes history data of the game played by the second user,
    the correction data includes second data on an event in the game that was not played by the second user, and
    the instruction causes the circuitry to, in the correction, add the second data to the second user information as the history data of the second user.

7. The non-transitory computer-readable medium according to claim 1, wherein
    the second user information includes history data of the game played by the second user,
    the correction data includes third data on an event in the game played by the second user, and
    the instruction causes the circuitry to, in the correction, correct data on the event included in the second user information as the history data using the third data.

8. The non-transitory computer-readable medium according to claim 1, wherein
    the second user information includes information on a second game content associated with the second user,
    the correction data includes second game content information on the second game content based on a first game content associated with the first user, and
    the instruction causes the circuitry to, in the correction, add the second game content information to the second user information as information on the second game content associated with the second user.

9. The non-transitory computer-readable medium according to claim 1, wherein
    the second user information includes a second user parameter of the second user,
    the correction data includes a first user parameter of the first user, and
    the instruction causes the circuitry to, in the correction, correct a value of the second user parameter of the second user included in the second user information using a value of the first user parameter.

10. The non-transitory computer-readable medium according to claim 1, wherein
the instruction causes the circuitry to
cause the second client device to display information on multiple correction data based on the first user information,
obtain, from the second client device, information on at least one correction data selected from the information on the multiple correction data in the second client device, and
in the correction, correct the second user information using the at least one correction data.

11. The non-transitory computer-readable medium according to claim 1, wherein
the instruction causes the circuitry to
cause the first client device to display information on multiple correction data based on the first user information,
obtain, from the first client device, information indicating at least one correction data selected from the multiple correction data in the first client device, and
in the correction, correct the second user information using the at least one correction data.

12. The non-transitory computer-readable medium according to claim 1, wherein
the instruction causes the circuitry to permit the second user to play a predetermined game part included in the game based on the corrected second user information.

13. A server device that provides a plurality of client devices of a plurality of users including at least a first client device and a second client device with a game played by the plurality of users, wherein the server device includes circuitry, the circuitry is configured to
obtain a first request from the first client device of a first user of the plurality of users,
responsive to obtaining the first request, output first identification information corresponding to the first user to the second client device of a second user of the plurality of users,
obtain a second request including the first identification information from the second client device of the second user, wherein the second request is output from the second client device responsive to the first identification information output to the second client device being selected in the second client device,
responsive to obtaining the second request, correct second user information on the second user using correction data based on first user information on the first user such that the second user then plays the game according to the corrected second user information, and
cause the second client device to display at least part of the corrected second user information.

14. A method comprising:
obtaining, by circuitry of a server device that provides a plurality of client devices of a plurality of users including at least a first client device and a second client device with a game played by the plurality of users, a first request from the first client device of a first user of the plurality of users,
responsive to obtaining the first request, outputting, by the circuitry, first identification information corresponding to the first user to the second client device of a second user of the plurality of users,
obtaining, by the circuitry, a second request including the first identification information from the second client device of the second user, wherein the second request is output from the second client device responsive to the first identification information output to the second client device being selected in the second client device,
responsive to obtaining the second request, correcting, by the circuitry, second user information on the second user using correction data based on first user information on the first user such that the second user then plays the game according to the corrected second user information, and
causing, by the circuitry, the second client device to display at least part of the corrected second user information.

* * * * *